United States Patent [19]

Roeder et al.

[11] Patent Number: 4,661,853

[45] Date of Patent: Apr. 28, 1987

[54] INTERFIELD IMAGE MOTION DETECTOR FOR VIDEO SIGNALS

[75] Inventors: Barbara J. Roeder, Pt. Pleasant, Pa.; Leopold A. Harwood, Bridgewater; Hermann J. Weckenbrock, Bordentown, both of N.J.

[73] Assignee: RCA Corporation, Princeton, N.J.

[21] Appl. No.: 794,222

[22] Filed: Nov. 1, 1985

[51] Int. Cl.$^4$ .................. H04N 7/18; H04N 5/14; H04N 5/213

[52] U.S. Cl. .................. 358/167; 358/160; 358/105; 358/36; 358/37

[58] Field of Search .............. 358/160, 167, 166, 37, 358/21 R, 36, 105; 382/52, 56, 27

[56] References Cited

U.S. PATENT DOCUMENTS

| | | | |
|---|---|---|---|
| 4,058,836 | 11/1977 | Drewery et al. | 358/167 |
| 4,163,249 | 7/1979 | Michael et al. | 358/21 |
| 4,184,206 | 1/1980 | Harano | 358/280 |
| 4,240,106 | 12/1980 | Michael et al. | 358/36 |
| 4,249,210 | 2/1981 | Storey et al. | 358/167 |
| 4,275,418 | 6/1981 | Trump et al. | 358/167 |
| 4,280,141 | 7/1981 | McCann et al. | 358/109 |
| 4,288,815 | 9/1981 | Miles | 358/105 |
| 4,361,853 | 11/1982 | Remy et al. | 358/167 |
| 4,494,140 | 1/1985 | Michael | 358/167 |
| 4,525,859 | 6/1985 | Bowles et al. | 382/54 |

FOREIGN PATENT DOCUMENTS

| | | |
|---|---|---|
| 60-27287 | 2/1985 | Japan . |
| 60-65681 | 4/1985 | Japan . |
| 60-65696 | 4/1985 | Japan . |
| 60-65697 | 4/1985 | Japan . |
| 60-86988 | 5/1985 | Japan . |
| 2031686A | 4/1980 | United Kingdom . |
| 2102651A | 2/1983 | United Kingdom . |
| 2138237A | 10/1984 | United Kingdom . |

OTHER PUBLICATIONS

Detlef Teichner, "Quality Improvement by Adaptive Inter/Intraframe Processing in PAL TV Receivers", presented ICCE, 6/7/85, Chicago.

G. Bostelmann, "A Codel for Video Telephone Signals with a Motion Detector Optimized by Subjective Tests", Frequenz 33, (1979), pp. 2–8.

Primary Examiner—James J. Groody
Assistant Examiner—Cynthia Smith
Attorney, Agent, or Firm—E. M. Whitacre; P. J. Rasmussen; E. P. Herrmann

[57] ABSTRACT

A motion detector for determining image motion in a video signal develops an array of signals representing the difference between pixels from adjacent frames. The array of signals are grouped into subarrays, each of which include the signal corresponding to the pixel under examination for motion. Each of the subarrays are independently examined to determine if the magnitude of all of the pixel differences represented in a particular subarray exceed a predetermined threshold and/or the pixel differences have like polarity. If these conditions are met in any one of the subarrays, a motion signal is produced.

12 Claims, 11 Drawing Figures

INTERFIELD IMAGE MOTION DETECTOR FOR VIDEO SIGNALS

This invention relates to motion detection circuitry for video signal processing apparatus employing signal memory.

BACKGROUND OF THE INVENTION

Video signal processing circuitry such as field/frame comb filters or field/frame recursive filters have been implemented to enhance the quality of images reproduced from video signals. These systems perform very well for images which do not contain motion (either image object motion or camera panning). In order to realize the advantages of these systems during intervals of image motion, circuitry has been devised to make them motion adaptive. For example, a motion adaptive frame recursive filter will have its signal scaling coefficients altered in accordance with the present and past motion. See, for example, U.S. Pat. No. 4,240,106, entitled "Video Noise Reduction".

Motion adaptive video signal processing systems require the detection of image motion. Basic motion detection involves comparing video signals from corresponding pixels in successive frames. The assumption is made that if corresponding pixels from successive fields/frames differ by an amount exceeding a fixed or variable noise threshold, motion has occurred between the fields/frames compared.

Unfortunately, the more basic motion detection methods generally provide unsatisfactory results. For instance, if the noise threshold is established at two high a level, some motion occurrences will not be detected.

Michael et al. in U.S. Pat. No. 4,240,106 describe two motion detectors which overcome some of the deficiencies of the aforedescribed basic motion detector. The Michael et al. detector employs an array of pixel differences disposed about the pixel currently being examined for motion. In the first system the respective picture point differences are independently compared to a threshold value to generate bilevel signals corresponding to respective pixels. The bilevel signals are applied to a majority logic gate which produces a motion signal if a majority of the pixel differences in the array have exceeded the threshold.

In the second system the pixel differences, of the array of pixels centered about the point under examination, are integrated to generate an average difference over the area. The average difference is then compared with a threshold. The object here is to differentiate between noise and movement. It is assumed that the larger the number of picture points integrated, the more likely the noise will average to zero, whereas movement remains unattenuated.

SUMMARY OF THE INVENTION

The present invention is a motion detector which operates on an array of pixel differences. The array of pixel differences is divided into subarrays, each one of which includes the picture point for which motion is currently being examined. Detection circuitry examines the pixel differences in each subarray. Only if all the pixel differences in at least one subarray exhibit a predetermined characteristic is a motion signal generated.

DETAILED DESCRIPTION

The processing system described below is presumed to operate on a sampled data video signal. Each sample from a particular frame represents a picture point and corresponds to like picture points or pixels in preceding and succeeding frames of video signal. If corresponding samples from two successive frames have different amplitude values, motion is presumed to have occurred in the image at those picture points. If the video signal being processed is either composite video signal or the chrominance component thereof, it is assumed that the interframe phase differences of the color subcarrier is compensated before detecting the sample differences. For example, the chrominance component of frame delayed NTSC signal may be inverted prior to measuring the differences between current and frame delayed samples. In actuality, a sample difference may not indicate motion, but may be the result of signal noise differences between the corresponding samples from the two frames. The invention to be described is designed to substantially eliminate false motion detection due to signal noise.

The invention will be described with respect to interframe pixel differences wherein the pixel differences are developed by comparing samples separated by an integral number, including one, of frame intervals. It will be appreciated by those skilled in the art that the invention is applicable to interfield pixel differences. In this instance the differences may be developed from pixels separated by one field plus or minus a one-half line interval or between pixels from one field and the average of pixels separated by one field plus and minus one-half line interval.

In FIGS. 1A–D, the arrays of circles represent pixel differences located at respective raster locations of a reproduced image. The circle at the center of each array corresponds to the pixel that is currently being examined for interframe image motion. The numbers in the circles identify the pixel differences. The values assigned to each circle is a logic one or zero. In one embodiment, the respective circle is assigned a logic one if the corresponding pixel difference exceeds a predetermined threshold value, and is assigned a logic zero if the difference is less than the threshold. In this instance, the difference values are designated herein as magnitude values. In another embodiment each respective circle is assigned a logic one value if the pixel difference is one polarity and a logic zero if the difference is the opposite polarity. In this instance, the difference values are designated as sign values.

Figure 1A:
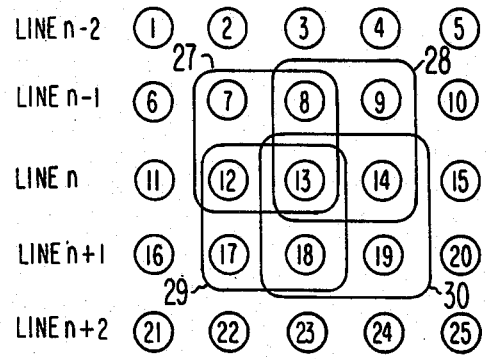
FIGS. 1A, 1B, 1C and 1D are pictoral representations of arrays of points representing the differences of pixels between fields or frames of video signals.

First consider the case wherein the circles represent magnitude values. Referring to FIG. 1A, in this example, only the pixel differences labelled 7–9, 12–14 and 17–19 are used to detect image motion at the center pixel 13. The array of pixels 7–9, 12–14 and 17–19 is divided into four subarrays designated 27, 28, 29 and 30, each containing the center pixel difference 13. A motion indicative signal will be generated for the center pixel only if all of the pixel differences in at least one of the subarrays 27–30 are all logic ones.

Figure 1B:
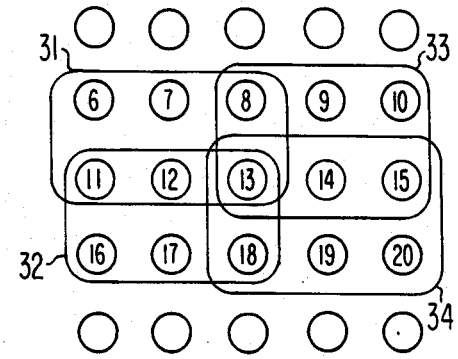

In FIG. 1B, the array of pixel differences 6–20 is utilized in determining image motion at the center pixel 13. The pixel differences 6–20 are grouped into the four subarrays 31–34. A motion indicative signal will be generated for the central pixel difference, 13, only if all of the pixel differences in at least one of the subarrays 31–34 are all logic ones.

Figure 1C:
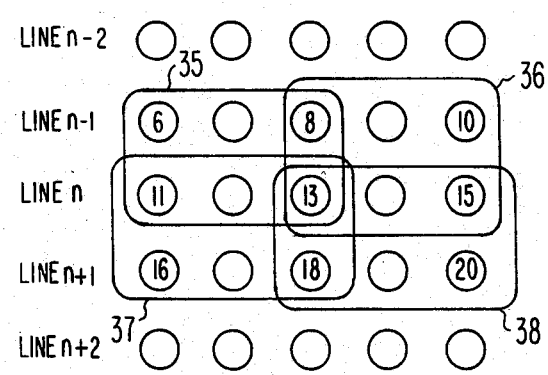

In FIG. 1C the pixel differences 6, 8, 10, 11, 13, 15, 16, 18 and 20 are utilized in the motion detection. These pixels are grouped into the subarrays 35–38. A motion indicative signal is generated for the sample differences 13 only if all of the labelled sample differences in at least one subarray are all logic ones. The implication of FIG. 1C is that all of the horizontally adjacent pixel differences in a subarray may not be utilized in the detection algorithm, i.e. the circles devoid of numbers are not used in the algorithm.

Figure 1D:
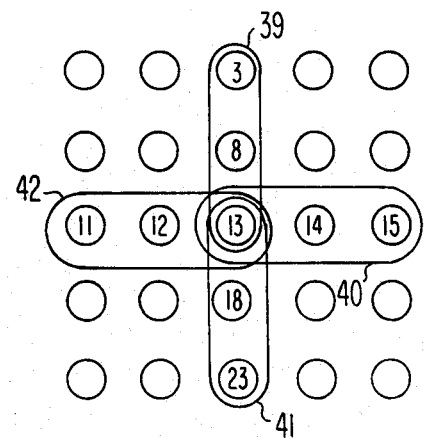

FIG. 1D shows one further arrangement of pixel difference subarrays 39–42. In this arrangement, the pixel differences 3, 8, 11–15, 18 and 23 are utilized in the motion detector. Again for a motion indicative signal to be generated for the pixel difference 13, all of the pixel differences in at least one of the subarrays 39–42 must be logic ones.

Figure 2:
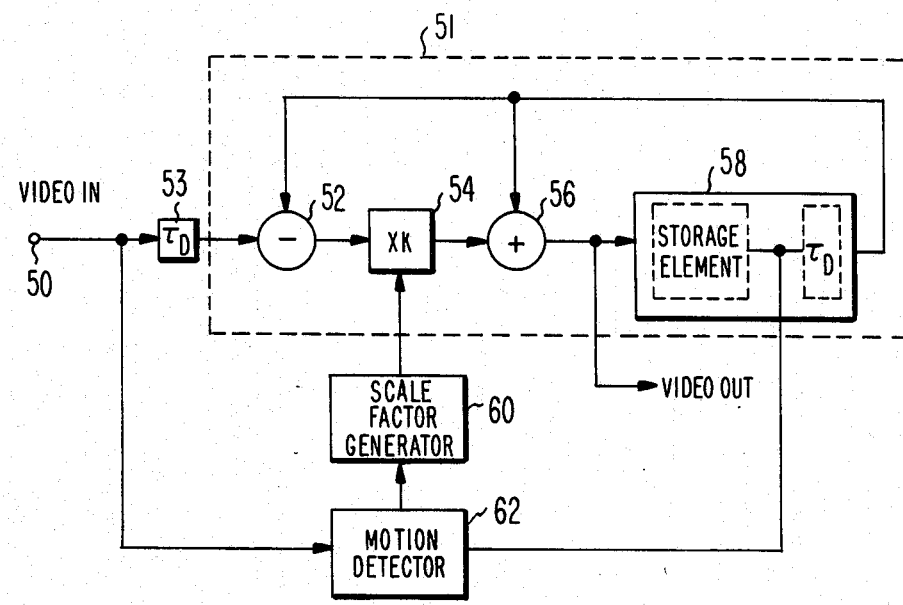
FIGS. 2 and 3 are block diagrams of alternative video signal recursive filters including motion adaptive processing circuitry.

FIG. 2 illustrates a motion adaptive recursive filter which includes an interframe image motion detector according to the present invention. In FIG. 2 the circuit elements circumscribed by the dashed line 51 form a known video signal recursive filter, the specific operational details of which are described in U.S. Pat. No. 4,240,106. Briefly, incoming video signal from terminal 50, and processed video signal from storage element 58, representing video signal delayed by one frame interval, are scaled and summed in complementary proportions K and 1-K by elements 52, 54 and 56 to generate the noise reduced signal VIDEO OUT. The recursive filter is rendered motion adaptive by varying the scale factor, K, between 1 and some small value less than 1. The scale factors are produced on a pixel-by-pixel basis by the scale factor generator 60 responsive to motion indicative signals from detector 62. The scale factor generator 60 may include memory elements to store the history of motion for all pixels over one or more frame periods. In this instance the value K will be determined from both the current and the past conditions of motion for each pixel. The signals applied to the motion detector 62 from input terminal 50 and the storage element 58 are presumed to be separated by precisely an integral number of frame intervals.

A compensating delay element 53 is interposed between the video input terminal 50 and subtracter 52, in order to provide the motion detector, 62, time to generate motion signals coincident with the corresponding pixel samples. Since the motion detector is required to be responsive to pixel samples separated in time by an integral number of frame periods, a delayed signal is tapped from the storage element 58 in advance of the normal output used for recursion. The tapped signal occurs in advance of the normal delayed output signal by a period equivalent to the delay provided by element 53. The length of the compensating delay will be determined by the particular motion detector structure.

Figure 3:
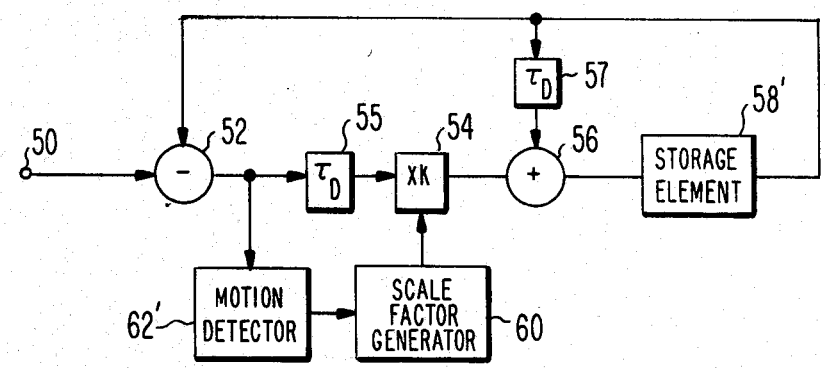

FIG. 3 illustrates an alternative motion adaptive recursive filter wherein the motion detector 62' is responsive to the pixel differences generated by subtracter 52. In this instance a compensating delay element 55 is interposed between subtracter 52 and scaler 54. A second similar delay element 57 is serially coupled between the output of the storage element 58' and adder 56. The storage element 58' is designed to provide the same delay as storage element 58 less the delay provided by the compensating delay element 55.

Figure 4:
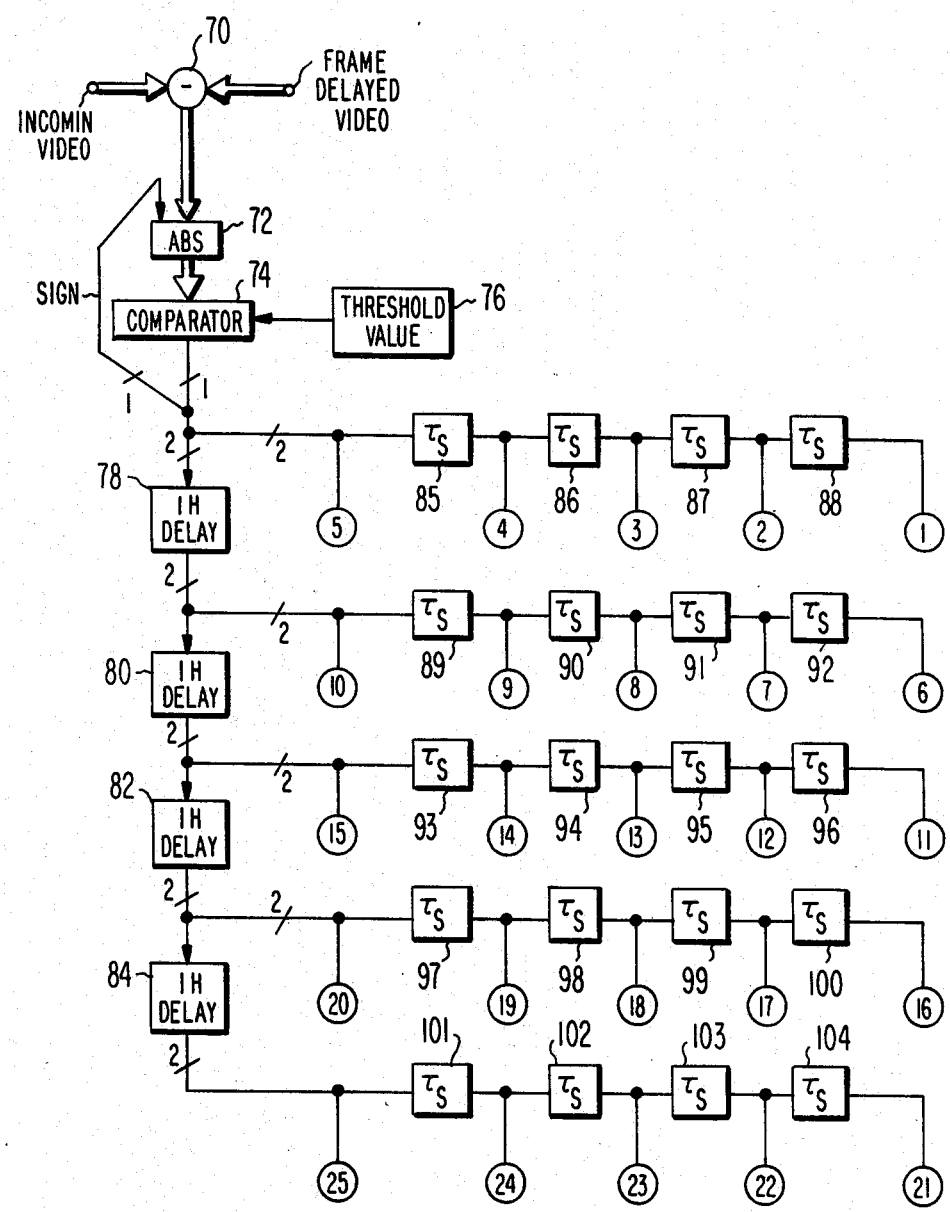
FIG. 4 is a block diagram of exemplary circuitry for developing the arrays of pixel differences illustrated in FIG. 1A.

FIG. 4 illustrates circuitry for generating the arrays of magnitude and sign pixel difference signals. In FIG. 4 the incoming and delayed video signals are assumed to be in binary format, and the processing elements are conventional binary circuits. Incoming video signal and video signal delayed by one frame interval are applied to respective input ports of subtracter 70. Subtracter 70 may correspond to subtracter 52 in FIG. 3 or it may be a separate circuit element. Subtracter 70 produces a difference output signal and a sign bit indicative of the polarity of the difference. The difference output signal and the sign bit are coupled to an absolute value circuit 72 which outputs the magnitudes only, of the difference signals. Absolute value circuit 72 may be either a one's complement circuit or a two's complement circuit including, for example, a bank of two input exclusive OR gates each having a first input terminal coupled to a respective one bit of the difference signal bus and a second input coupled to the sign bit connection.

The magnitude values from the absolute value circuit 72 are coupled to one input port of comparator 74. A threshold value from a source of threshold values 76 is coupled to a second input port of comparator 74. The threshold value from source 76 may be a constant value or alternatively it may be made variable responsive to, for example, the signal-to-noise ratio of the incoming video signal.

Comparator 74 produces a one-bit bilevel signal which has a first logic state if the magnitude of the difference signal exceeds the threshold value and a second logic state otherwise.

The sign bit from subtracter 70 is concatenated with the bilevel signal from comparator 74 to form a two-bit signal. This two-bit signal is coupled to the input port of the one-horizontal-line delay element 78, to the two-bit output port, 5, and to the cascade connection of one-sample-period delay elements 85–88. The output of delay element 78 is coupled to the cascade connection of the one-horizontal-line delay elements 80–84, to the two-bit output port, 10, and to the cascade connection of one-sample-period delay elements 89–92. The output of delay element 80 is coupled to the two-bit output port, 15, and to the cascade connection of one-sample-period delay elements 93–96. The output of delay element 82 is coupled to the two-bit output port, 20, and to the cascade connection of one-sample-period delay elements 97–100. The output of delay element 84 is coupled to the two-bit output port, 25, and to the cascade connection of one-sample-period delay elements 101-104.

Each of the one-sample-period delay elements is coupled respectively to a two-bit output port respectively labelled 1-4, 6-9, 11-14, 16-19 and 21-24. The output ports labelled 1-25 produce magnitude and sign signals corresponding to the pixel differences labelled 1-25 in FIG. 1A.

Figure 5:
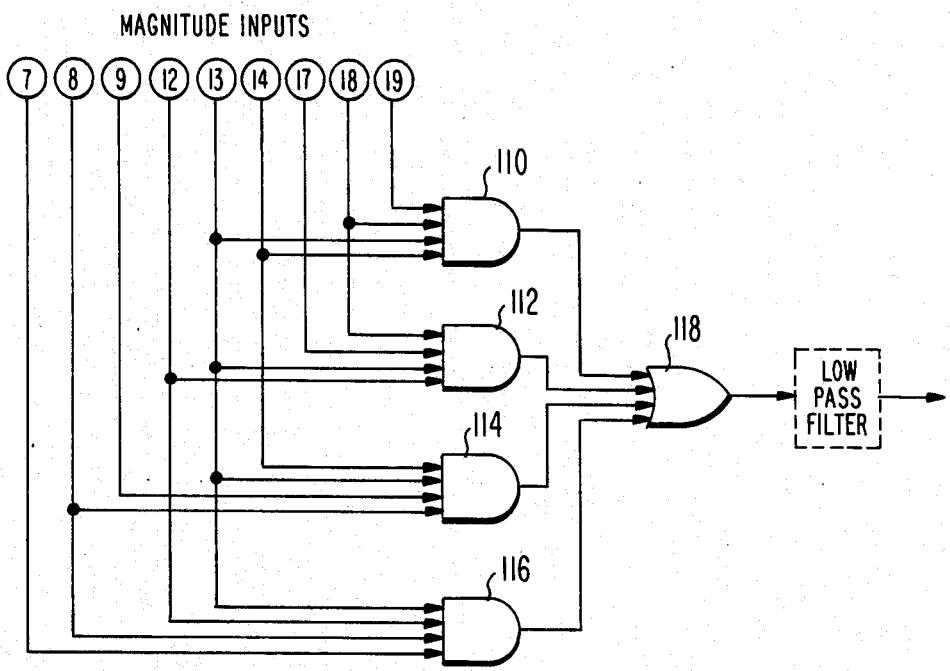
FIGS. 5 and 6 are logic schematic diagrams of exemplary logic circuits for detecting when subarray's of magnitude representative signals have like logic states.

FIG. 5 is an example of logic circuitry for detecting when all of the pixel differences in at least one of the subarrays of FIG. 1A exceed the threshold value. In FIG. 5 the MAGNITUDE INPUTS labelled 7-9, 12-14 and 17-19 correspond to the magnitude bit connections of the output ports 7-9, 12-14 and 17-19 of FIG. 4. The magnitude signals corresponding to subarray 27 of FIG. 1A, i.e. 7, 8, 12 and 13, are coupled to respective input terminals of the four-input AND gate 116. AND gate 116 produces a logic one output only if all of the signals applied to its four input terminals are logic ones. Thus, AND gate 116 develops a logic one output only if all of the magnitude signals of the pixel differences of subarray 27 are logic ones, i.e. when all of the pixel differences of subarray 27 exceed the threshold.

AND gates 114, 112 and 110 are similarly respectively coupled to receive the magnitude values of subarrays 28, 29 and 30. These AND gates produce logic one outputs only if all of the magnitude values in their respective subarrays are logic ones. The output terminals of AND gates 110-116 are coupled to respective input terminals of the four-input OR gate 118. OR gate 118 produces a logic one output, indicating image motion for the central pixel, 13, whenever any one of the AND gates 110-116 produces a logic one output signal.

The logic circuitry of FIG. 5 combined with the circuitry of FIG. 4 comprises one embodiment of the motion detector of the present invention.

Figure 6:
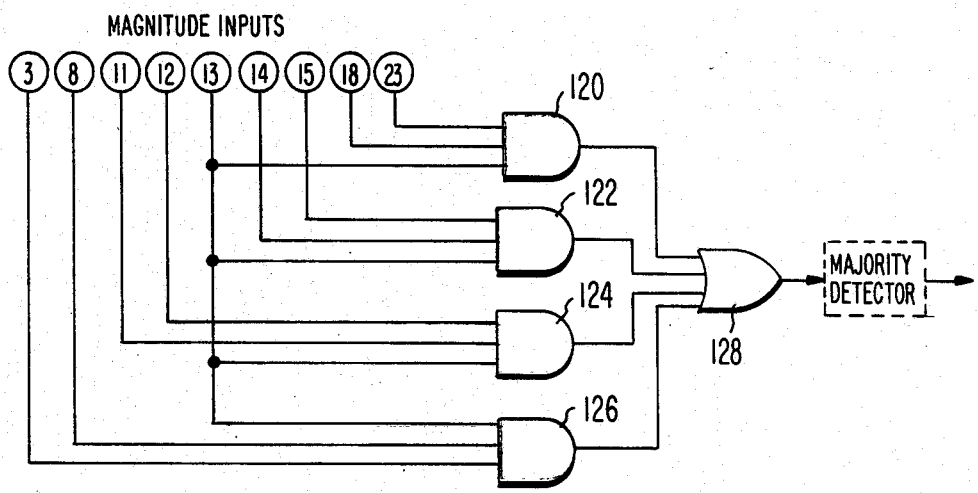

FIG. 6 is an example of logic circuitry for determining if the magnitude values of the subarrays illustrated in FIG. 1D indicate motion. In FIG. 6 the MAGNITUDE INPUTS 3, 8, 11-15, 18 and 23 correspond to the magnitude bit outputs of like numbered output ports in FIG. 4. AND gates 120-126 are respectively coupled to the magnitude inputs of subarrays 41, 40, 42 and 39 respectively. When all of the magnitude values of a subarray are logic ones, the respective AND gate coupled thereto develops a logic one output. The output terminals of AND gates 120-126 are coupled to respective input terminals of OR gate 128 which develops a logic one output signal (indicating motion at pixel 13) when one or more of the AND gates 120-126 produces a logic one output. The logic circuitry of FIG. 6 combined with the circuitry of FIG. 4 is another embodiment of the invention.

A further method for detecting motion and discriminating noise with an array of signals representing pixel differences is to examine the polarity of the pixel differences. If the polarity of pixel differences surrounding the pixel under examination alternates between positive and negative polarity, there is a high probability that the pixel difference is the product of noise on the signal. In a motion adaptive recursive filter it is undesirable to produce a motion signal from a noise-produced pixel difference since the adaptive circuitry will tend to curtail the noise reduction process when it is most needed. To minimize such false motion detection, the polarity of the pixel differences in subarrays of pixel differences including the pixel under examination, are examined to determine whether the polarity of all the pixel differences in at least one subarray is the same. If the polarity of the pixel differences in at least one subarray, such as the subarrays illustrated in FIGS. 1A-D, is the same, and if the pixel difference of the pixel being examined exceeds the threshold, then a motion signal is generated. Exemplary circuitry to produce this result employing sign values from the subarrays of FIG. 1A is illustrated in FIG. 7.

Figure 7:
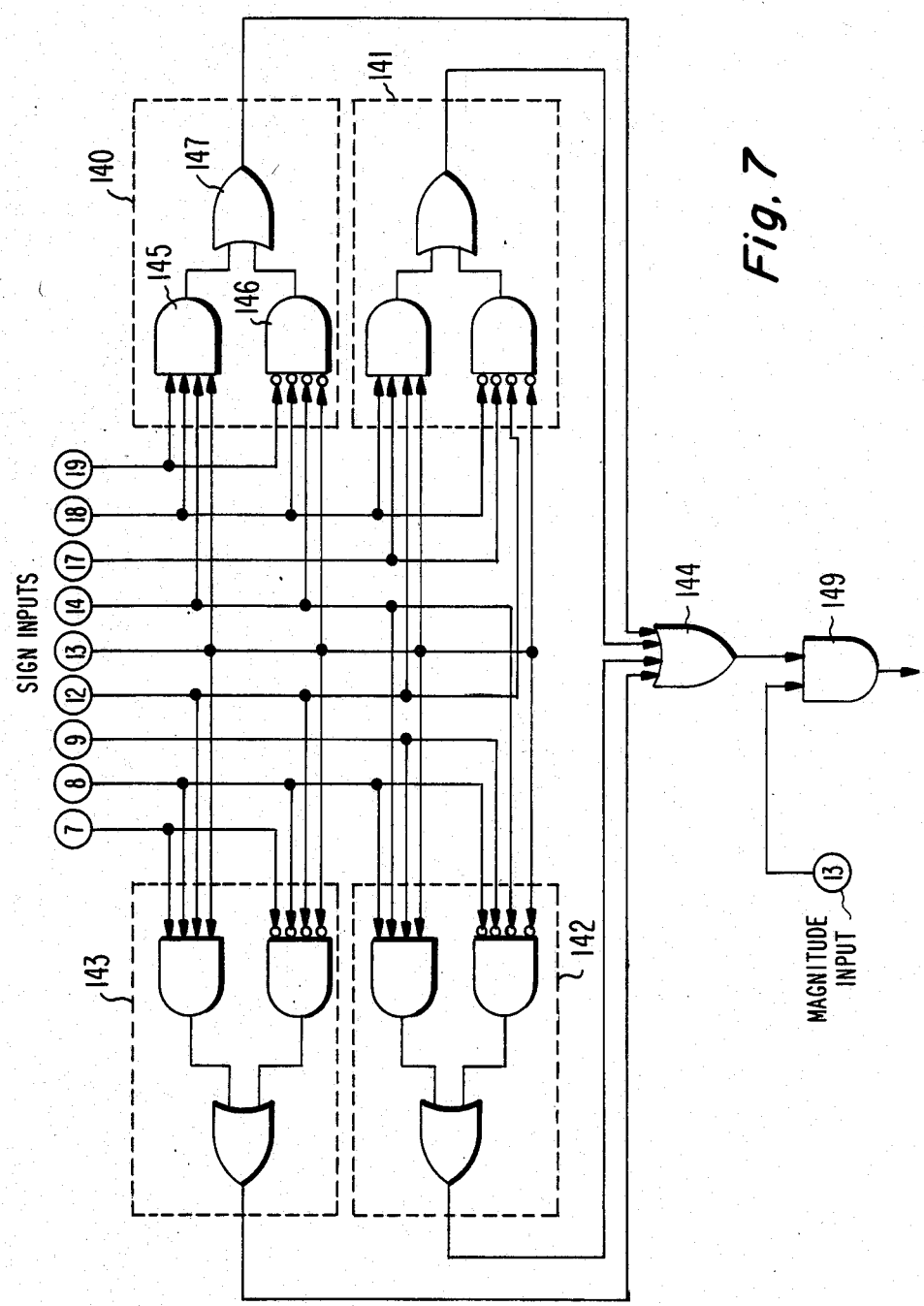
FIG. 7 is a logic schematic diagram of exemplary logic circuitry for detecting when subarrays of polarity representative signals are all of like polarity.

In FIG. 7 the SIGN INPUTS correspond to the sign bit connections of the respective output ports of FIG. 4. The logic elements circumscribed by the dashed lines 140-143 are respective detection circuits that detect when the polarity of the sign values are all negative or all positive for subarrays 30, 29, 28 and 27 respectively. If the sign values for a particular subarray 27-30 are all of like sign, the corresponding detection circuit develops a logic one output. The output terminals of the detection circuits 140-143 are coupled to respective input terminals of the four-input OR gate 144. OR gate 144 produces a logic one output whenever any one of the detection circuits 140-143 produces a logic one output. The output terminal of OR gate 144 is coupled to one input terminal of the two-input AND gate 149. The second input of AND gate 149 is coupled to the magnitude bit of the output port (FIG. 4) corresponding to the pixel being examined. AND gate 149 produces a logic one output, indicating motion, only if the pixel difference of the pixel being examined is above threshold and the output of OR gate 144 is a logic one indicating that the signs of at least one of the subarrays are all the same polarity.

The four detection circuits 140-143 are similar and operate as follows. Refer to detection circuit 140. The sign values of the pixel differences of the subarray, 30, are coupled to respective input terminals of the four-input AND gate 145. AND gate 145 generates a logic one output if all of the sign values in subarray 30 are logic ones. The sign values of the subarray, 30, are also coupled to respective input terminals of the four-input AND gate 146. AND gate 146 has inverting input terminals, indicated by the small "O"'s at the input connections, and produces a logic one output only if all of the sign values applied thereto are logic zeroes. The output terminals of AND gates 145 and 146 are coupled to respective input terminals of OR gate 147. OR gate 147 produces a logic one output if the output signals produced by either AND gate 145 or 146 is a logic one.

Circuitry similar to that illustrated in FIG. 7 may readily be designed by one skilled in the art of signal processing to analyze the sign values of the subarrays of FIGS. 1B-D.

Figure 8:
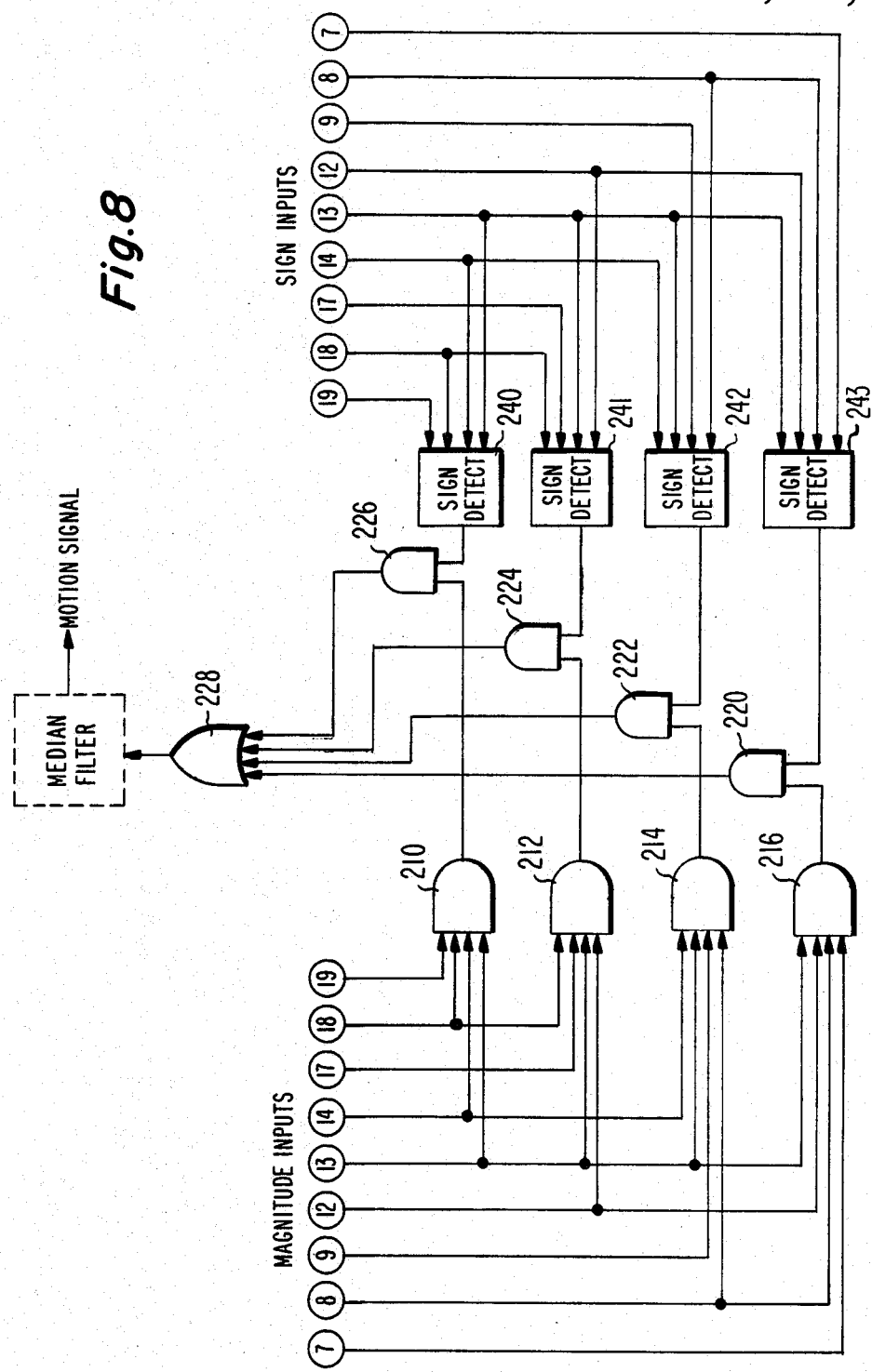
FIG. 8 is a partial logic schematic and partial block diagram of circuitry for detecting when a subarray of magnitude representative and polarity representative signals concurrently have like magnitude values and like polarity values.

FIG. 8 illustrates exemplary circuitry which combines the attributes of the subarray magnitude detection circuitry of FIG. 5 and the sign detection circuitry of FIG. 7. The circuitry of FIG. 8 analyzes the magnitude values and the sign values of each subarray. If the magnitude values from a particular subarray are all logic ones and concurrently the sign values from the same subarray are all of like polarity, in at least one of the subarrays, a motion signal is generated.

In FIG. 8 the MAGNITUDE INPUTS and the SIGN INPUTS correspond to the magnitude bit connections and the sign bit connections of the corresponding two-bit output ports of FIG. 4. The magnitude values are coupled to the AND gates 210-216. AND gates 210-216 produce respective logic one output signals only when all of the magnitude values of respective subarrays 30, 29, 28 and 27 are logic ones. The sign values are coupled to sign detection circuits 240-243, each of which may be similar to circuitry 140. Detection circuits 240-243 produce respective logic one output signals only when all the sign values of respective subarrays 30, 29, 28 and 27 are of the same polarity. The output terminals of AND gate 210 and sign detection circuit 240 are coupled to first and second input terminals of the two-input AND gate 226. AND gate 226 develops a logic one output signal only when the magnitude values of subarray 30 all exceed the threshold and the sign values of subarray 30 are all of like polarity. The output terminals of AND gates 212, 214 and 216 and the output terminals of corresponding sign detection circuits 241, 242 and 243 are similarly respectively coupled to the input terminals of AND gates 224, 222 and 220. AND gates 224, 222 and 220 respectively develop logic one output signals when the magnitude and sign values of subarrays 29, 28 and 27 satisfy the criteria of all exceeding the threshold and being of like polarity.

The output terminals of AND gates 220-226 are coupled to respective input terminals of the four-input OR gate 228. OR gate 228 produces a motion signal whenever any one of the output signals from AND gates 220-226 is a logic one.

The combination of the FIG. 4 and FIG. 8 circuits comprise a motion detector embodying the present invention.

The motion signals developed by the detection circuits of FIGS. 5-8 may be further filtered by e.g. median filters (majority detectors) or integrating filters to provide additional noise immunity.

The foregoing description, of motion detection circuitry utilizing subarrays of signals representing pixel differences, sets forth a limited number of examples. Armed with the foregoing, other examples within the scope of the invention will immediately come to mind. For example, the magnitude detection circuits of FIGS. 5 or 6 may be combined with the sign detection circuit of FIG. 7 wherein the motion signals developed by the apparatus of FIGS. 5 or 6 may be coupled to the MAGNITUDE INPUT of AND gate 149 in FIG. 7. Alternatively a motion signal developed according to, for example, the apparatus in U.S. Pat. No. 4,240,106 may be coupled to the MAGNITUDE INPUT terminal of AND gate 149 of FIG. 7. In addition, the logic circuits of FIGS. 5-8 were selected for clarity of explanation. One skilled in the art of logic design will readily be able to reduce the number of gates to minterm realizations of the circuitry since many of the logic gates illustrated are addressed by common signals.

What is claimed is:

1. A motion detector for detecting image motion in a video signal from sampled data signals representing differences between pixels separated by substantially integral numbers of field intervals, comprising:
   a source of said sampled data signals representing pixel differences;
   means coupled to said source for concurrently providing a plurality of said sampled data signals corresponding to an array of pixel differences disposed about and including a pixel difference under examination for image motion;
   detection means coupled to said means for providing a plurality of sample data signals, for examining subarrays of said sampled data signals, each subarray including the sampled data signal corresponding to the pixel difference under examination and at least one sample data signal exclusive of the other subarrays, and providing a motion signal if all of the sampled data signals in any one of the subarrays exhibit a like predetermined characteristic.

2. The motion detector set forth in claim 1 wherein said predetermined characteristic constitutes magnitude information and said detection means provides a motion signal if the magnitudes of all of the pixel differences in any of said subarrays exceed a predetermined magnitude.

3. The motion detector set forth in claim 1 wherein the predetermined characteristic constitutes polarity information and said detection means provides a motion signal if all of the pixel differences in any of said subarrays exhibit like polarity.

4. The motion detector set forth in claim 1 wherein said predetermined characteristic constitutes magnitude and polarity information, and said detection means provides said motion signal if all of the pixel differences exceed a predetermined magnitude concurrently with all of the pixel differences exhibiting like polarity in the same subarray, for any one of said subarrays.

5. The motion detector set forth in claim 1 wherein said means for providing a plurality of said sampled data signals, provides a plurality of said sampled data signals from each of three horizontal lines, said pixel difference under examination being symmetrically disposed within said three horizontal lines and wherein said detection means examines four subarrays of said sampled data signals, each of said four subarrays including sample data signals from two of said horizontal lines and each of said subarrays including sampled data signals included in at least one other of said subarrays of sampled data signals.

6. A motion detector for detecting image motion in a video signal from sampled data signals representing differences between pixels separated by substantially integral numbers of field intervals, comprising:
   a source of said sampled data signal representing pixel differences;
   means including means coupled to said source and having a plurality of output ports for providing a plurality of said sampled data signals, said plurality of signals corresponding to an array of pixels disposed about and including a pixel under examination for image motion;
   a plurality of detection means each having a plurality of input terminals less in number than said plurality of output ports, and coupled to said plurality of output ports so that signals coupled to each of said detection means correspond to a subarray, including said pixel under examination, of said array of pixels, for producing an output signal having a first state when all of the signals in said subarray have a like property and a second state otherwise; and
   means coupled to said plurality of detection means for producing a motion signal whenever any one of said detection means produces an output signal in said first state.

7. The motion detector set forth in claim 6 wherein the means including means further includes:
   a threshold detector coupled to said source for providing a bilevel output signal having a first state when said pixel differences exceed a predetermined threshold value and a second state when said pixel differences are less than said predetermined threshold value; and means for coupling said threshold detector to an input of said means having a plurality of output ports.

8. The motion detector set forth in claim 7 wherein each of said detection means comprises a logic circuit responsive to said bilevel signals provided by said threshold detector, and produces an output signal in said first state whenever all of said bilevel signals applied to its plurality of input terminals are concurrently in the first state of said threshold detector output signal.

9. The motion detector set forth in claim 6 wherein said means including means further includes:
    means coupled to said source for providing a bilevel signal representing the polarity of said pixel differences, said bilevel signal having first and second states for positive and negative pixel differences respectively; and
    means for coupling said bilevel signal to said means having a plurality of output ports.

10. The motion detector set forth in claim 9 wherein each of said detection means comprises:
    logic circuitry responsive to said bilevel signals for producing said output signal in said first state whenever all of the bilevel signals applied to its input terminals are in said first state of said bilevel signals or all of the bilevel signals applied to its input terminals are in said second state of said bilevel signals.

11. The motion detector set forth in claim 10 wherein said means including means further includes:
    a threshold detector coupled to said source, for providing a further bilevel signal having a first state when said pixel differences exceed a predetermined threshold value and a second state when said pixel differences are less than said predetermined threshold value; and
    wherein said means for producing said motion signal includes logic circuitry coupled to said plurality of detection means and is responsive to said further bilevel signal to produce said motion signal when any one of said detection means produces a respective output signal in said first state and the further bilevel signal corresponding to the pixel under examination is in the first state of said further bilevel signal.

12. The motion detector set forth in claim 6 wherein said sampled data signals representing said pixel differences is a two-bit logic signal, a first bit of said two-bit signal representing the polarity of said pixel difference and a second bit of said two-bit signal representing whether the magnitude of the pixel difference exceeded a predetermined threshold value and wherein each of said plurality of detection means comprises:
    a first logic circuit responsive to respective first bits available at said output ports for providing an output signal in a first state whenever all of said first bits applied to its input terminals are in a like logic state;
    a second logic circuit responsive to respective second bits available at said output ports for providing an output signal in a first state whenever all of said second bits exhibit a logic state representing that the magnitudes of the pixel differences exceeded said threshold value; and
    a third logic circuit coupled to said first and second logic circuits, for producing an output signal in said first state responsive to said first and second logic circuits concurrently providing output signals in their respective first states.

* * * * *